Patented Aug. 20, 1940

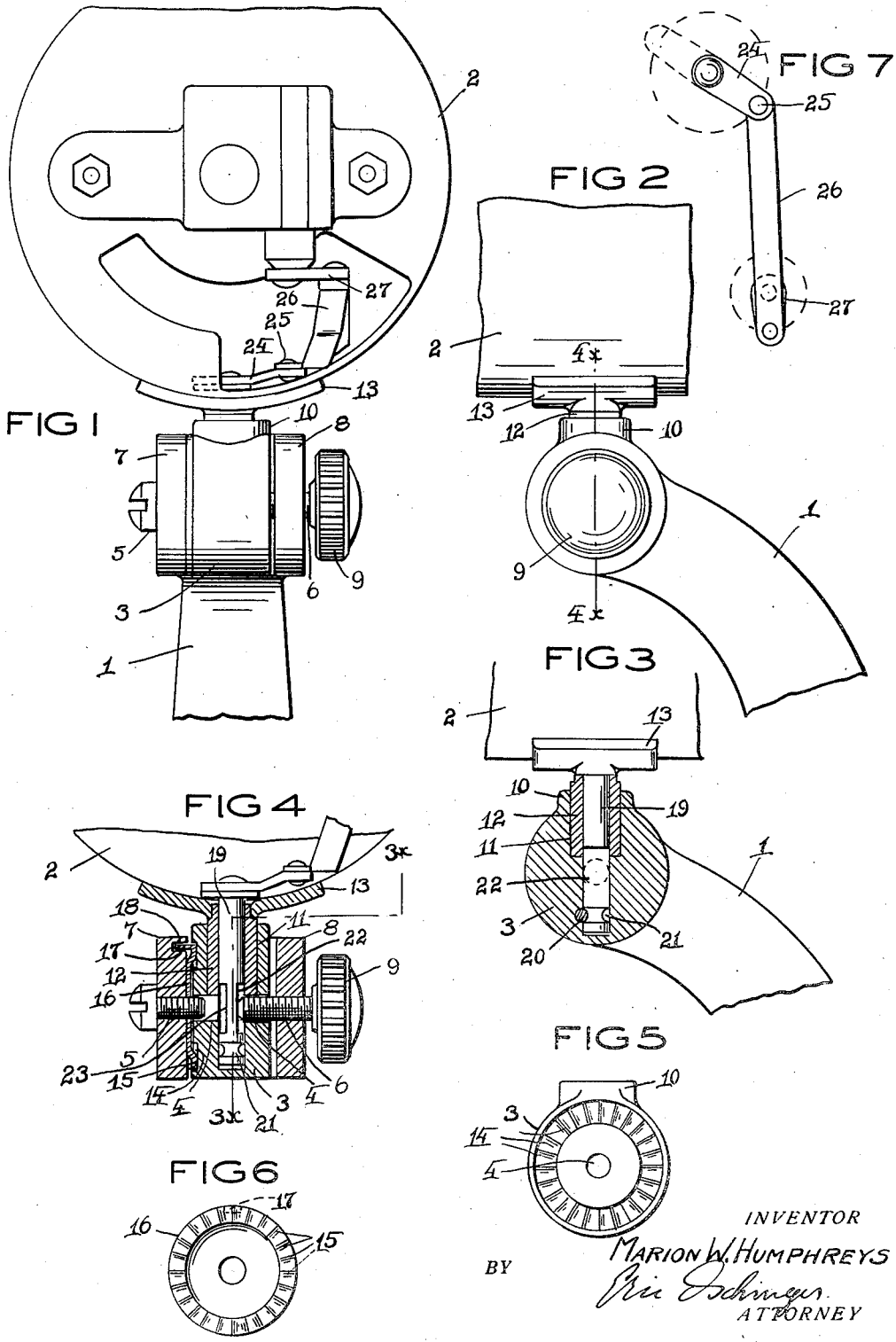

2,212,068

UNITED STATES PATENT OFFICE 2,212,068

UNIVERSAL JOINT

Marion W. Humphreys, Rochester, N. Y., assignor, by mesne assignments, to Seaboard Commercial Corporation, New York, N. Y., a corporation of Delaware Application February 8, 1938, Serial No. 189,388

10 Claims. (Cl. 287—14)

This invention relates to universal joints for table and wall fixtures and has for one of its objects to provide a universal joint which is especially adapted for use on a combined table and wall standard for electric fans.

Another object of this invention is to provide a universal joint for fixtures in which the construction thereof is extremely simple so that it may be quickly and easily adjusted with a single clamping member.

A further object of this invention is to provide a universal joint construction by which the member supported thereby may be positively held in any adjusted position.

All these and other objects and attendant advantages of the invention will become more readily apparent from the detailed description thereof which follows, reference being had to the accompanying drawing in which Figure 1 is a front elevation of the outer portion of a standard or bracket provided with my universal joint including a portion of the member supported thereby.

Figure 2 is a side elevation of the same members.

Figure 3 is a vertical sectional view of the universal joint, the section being taken on the line 3x—3x of Figure 4.

Figure 4 is a vertical sectional view of the universal joint, the section being taken on the line 4x—4x of Figure 2.

Figure 5 is a detail side elevation of one of the members of the universal joint.

Figure 6 is a detail side elevation of the locking washer of the universal joint.

Figure 7 is a diagrammatic view of the crank and link connection used in oscillating fan constructions for oscillating the motor housing on the supporting standard.

The universal joint, forming the subject matter of my present invention, is especially adapted for use in combination with electric fan mountings for adjustably supporting both stationary and oscillating fans on either a table support or a wall support. As illustrated in the figures, the universal joint is embodied in the outer end of the bracket or standard 1 which is provided with a suitable base (not shown) for its support. Shown supported by the universal joint at the outer end of the bracket is a portion of a motor housing 2. However, it will be apparent that any other member or fixture may be supported by the bracket and universal joint.

The universal joint is made up of a swivel member in the form of a substantially circular disc 3. This disc has a central hole 4 which serves as the bearing for the swivel member. Pivot screws 5 and 6 (see Figure 4) project into this hole from opposite sides to pivotally support the swivel member between the lugs 7 and 8 of the bracket 1. The pivot screws 5 and 6 are threaded centrally thru the lugs 7 and 8 and while pivot screw 5 normally remains fixed, pivot screw 6 is provided with a knob 9 with which it may be threaded in and out for the adjustment of the universal joint.

The swivel member carries on its periphery a boss 10 and extending into the swivel member thru this boss is the radial bearing 11. A pivot sleeve 12 is adapted to be mounted in this radial bearing so that the motor housing 2, attached thereto by means of the supporting flange 13, is rotatable on the swivel member in a plane at right angles to that of the axis of rotation of the swivel member. In this way the motor housing may be moved to swing with the swivel member into any angular position in a vertical plane and also turned on the swivel member in a plane at right angles thereto to provide for the adjustment of the housing in a vertically as well as horizontally angular position on the bracket 1.

For the purpose of locking the swivel member into the angular positions between the ears 7 and 8, one side of this member is provided with a series of circularly arranged radial serrations 14. These serrations are adapted to be engaged by corresponding serrations 15 provided on a locking washer 16. The latter is interposed between the swivel member 3 and the ear 7 and is loosely held in place by the pivot screw 5. To keep this locking washer from rotating, a lug 17 is bent from the washer so as to project laterally at the perimeter thereof and this lug is adapted to engage into the depression 18 provided on the inside of the ear 7. The serrations on the locking washer are offset so as to readily engage between the serrations of the swivel member as illustrated in Figure 4. When therefore the swivel member is forced laterally to the left in Figure 4 by means of the pivot screw 6, the serrations of the swivel member interlock with the serrations of the locking washer which cause the locking washer to hold the swivel member in whatever angular position it has been placed.

The pivot sleeve 12 is indirectly locked by the pivot screw 6 by having this screw engage the pivot pin 19 and thru the pressure applied thereto clamp the sleeve in place. In this way the pivot pin is clamped in place in the pivot sleeve and the pivot sleeve is clamped in place in the swivel member while the swivel member is forced against the serrated locking washer with the serrations thereof engaging the serrations of the swivel member. The locking washer, being held against rotation by the interlocking engagement of its lug 17 with the depression 18 in the ear 7, thus positively locks the swivel member and with it the motor housing fixedly in place on the end of the bracket 1.

For the adjustment of the motor housing on the swivel member but a slight release of the pivot screw 6 is thus necessary, whereas for the adjustment of the swivel member with the motor housing, the pivot screw must be released until the serrations of the swivel member are disengaged from the serrations of the lock washer.

As above pointed out, the same universal joint construction is adapted for use with oscillating fan motors. In this construction the pivot pin 19 is rotatably anchored in the swivel member by means of the pin 20 which, in extending thru the swivel member, engages the annular groove 21 of the pivot pin as illustrated in Figure 5. The pivot pin is thus free to rotate in the swivel member while being held against endwise movement therein. Two oppositely located flat sections 22 and 23 are provided on the pivot pin so that the end of the pivot screw 6 may be brought into engagement with either one or the other thereof when the pivot screw is operated to clamp the swivel member in place. In this way the pivot pin is held against rotation in the bearing sleeve 12 whenever the swivel member is locked in place as above pointed out.

In an oscillating fan the pivot pin carries at the top a crank 24 in order to provide an eccentric pivot point 25 for the link 26. The latter is connected to the rotating crank 27 carried by the rotatable motor housing so that the rotation of this crank against the link causes the motor housing to oscillate thru a predetermined arc.

The general direction in which the arc oscillates the motor housing is determined by the position of the eccentric pivot point 25 and the oppositely located flat sections on the pivot pin permit this pin to be held against rotation by the pivot screw 6 in two positions. In this way the motor housing may be made to oscillate thru one arc when the pivot pin 19 is adjusted so as to hold the crank in the full line position in Figure 7, and thru another arc when the pivot pin is adjusted to hold the crank in the dotted line position in Figure 7.

From the foregoing it will be apparent that I have devised a universal joint which may be adjusted to positively hold the member which is supported thereby in practically any angular position and provide such an adjustment by the use of but one adjusting screw and in addition provide for a predetermined setting for the oscillation of the supported member with the same adjusting screw.

I claim:

1. A universal joint comprising a swivel member, means for rotatably supporting said swivel member, a supporting member rotatably mounted in said swivel member and a threaded pivot member cooperating with said supporting means in supporting said swivel member, said pivot member extending thru said swivel member into engagement with said supporting member for adjustably clamping said swivel member and said supporting member against rotation.

2. A universal joint comprising a swivel member having a central hole therethru, substantially fixed and movable pivot members engaging into said hole from opposite sides thereof for the pivotal support of said swivel member, locking means surrounding one of said pivot members, a supporting member rotatably mounted in said swivel member, said movable pivot member being adapted to engage said supporting member in said swivel member and hold it against rotation therein and causing said swivel member to engage said locking means to hold said swivel member against rotation on said pivot members.

3. A universal joint for a supporting bracket having a supporting member, a swivel member, pivotal means for rotatably supporting said swivel member to one side of said supporting member, a locking member interposed between said swivel member and said supporting member, a pivot member radially mounted in said swivel member and single clamping means for clamping said swivel member against said locking member and holding said pivot member against rotation in said swivel member.

4. A universal joint for a supporting bracket having a pair of spaced supporting lugs, comprising a swivel member, a pivotal means for rotatably supporting said swivel member between said spaced supporting lugs, a fixedly held locking washer interposed between said swivel member and one of said supporting lugs, a pivot member radially mounted in said swivel member and single clamping means to clamp said swivel member against said locking washer and hold said pivot member against rotation in said swivel member.

5. A universal joint for a supporting bracket having a pair of spaced supporting lugs, a pivot member extending thru each of said supporting lugs into the space between them, a swivel member located between said supporting lugs so as to be partially supported by and mounted to rotate on the ends of said pivots, locking means interposed between said swivel member and one of said supporting lugs, a pivot pin radially mounted in said swivel member and means for moving one of said pivot members so as to engage said pivot pin and hold it against rotation in said swivel member and force said swivel member against said locking means to hold said swivel member against rotation between said supporting lugs.

6. A universal joint for a supporting bracket having a pair of spaced supporting lugs, a swivel member located between said lugs, a pivot member carried by each of said lugs and engaging said swivel member to rotatably and slidably support said swivel member between said lugs, a washer held nonrotatably mounted on one of said pivot members interposed between said swivel member and one of said lugs, a serrated face on said washer, a serrated face on said swivel member opposite to said washer, a pivot pin radially mounted to rotate in said swivel member, one of said pivot members being movable endwise to engage said pivot pin and hold it against rotation in said swivel member while forcing said swivel member against said washer to have the serrated faces thereof hold the swivel member against rotation between said lugs.

7. In a universal joint the combination of a pair of supporting lugs, a swivel member rotatably and laterally movable between said supporting lugs, a radially arranged bearing in said swivel member, a pivot pin mounted to rotate in said bearing, flat surfaces on said pivot pin, a clamping screw extending into said swivel member against one of said flat surfaces to hold said pivot pin in a predetermined position in said swivel member and said swivel member against one of said supporting lugs.

8. In a universal joint the combination of a supporting member, a swivel member rotatably mounted on said supporting member, a radial bearing in said swivel member, a pivot pin rotatably supported within said bearing, a plurality of flat faces circumferentially aranged on said pivot pin, a clamping screw extending into said swivel member against one of the flat faces of said pivot pin to hold said pin in a predetermined position in said swivel member and clamp said swivel member against said supporting member.

9. In a universal joint the combination of a supporting member having a supporting lug, a swivel member rotatably mounted on said supporting lug, a radial bearing in said swivel member, a sleeve member mounted in said bearing so as to be rotatable therein, a pivot member rotatably mounted in said sleeve member, a plurality of flat faces circumferentially arranged on said pivot pin, a clamping screw extending into said swivel member into engagement with one of the flat surfaces of said pivot pin to clamp said pin against rotation in said sleeve member and hold said sleeve member against rotation in said swivel member.

10. In a universal joint the combination of a supporting member having a supporting lug, a swivel member rotatably mounted on said supporting lug, a radial bearing in said swivel member, a sleeve member rotatably adjustable in said bearing, a pivot pin rotatably mounted in said sleeve member and means carried by said swivel member to hold said pivot pin against endwise movement in said sleeve member.

MARION W. HUMPHREYS.